US012562129B2

(12) United States Patent
Yang et al.

(10) Patent No.: US 12,562,129 B2
(45) Date of Patent: Feb. 24, 2026

(54) DISPLAY DEVICE AND DISPLAY DRIVING CIRCUIT AND OPERATING METHOD THEREOF

(71) Applicant: Novatek Microelectronics Corp., Hsinchu (TW)

(72) Inventors: Hao-Jan Yang, Hsinchu County (TW); Wei-Lun Shih, Hsinchu (TW); Kun-Zheng Lin, Hsinchu (TW); Chun-Hung Chen, Yunlin County (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 18/791,431

(22) Filed: Aug. 1, 2024

(65) Prior Publication Data

US 2025/0363957 A1 Nov. 27, 2025

Related U.S. Application Data

(60) Provisional application No. 63/650,877, filed on May 22, 2024.

(51) Int. Cl.
*G09G 3/3275* (2016.01)
*G09G 3/20* (2006.01)

(52) U.S. Cl.
CPC ......... *G09G 3/3275* (2013.01); *G09G 3/2096* (2013.01); *G09G 2330/021* (2013.01); *G09G 2330/028* (2013.01)

(58) Field of Classification Search
None
See application file for complete search history.

(56) References Cited

U.S. PATENT DOCUMENTS

| | | | |
|---|---|---|---|
| 11,862,086 | B2 | 1/2024 | Park et al. |
| 2003/0132906 | A1 | 7/2003 | Tanaka et al. |

(Continued)

FOREIGN PATENT DOCUMENTS

| | | |
|---|---|---|
| TW | 200302449 | 8/2003 |
| TW | 202303563 | 1/2023 |

OTHER PUBLICATIONS

"Office Action of Taiwan Counterpart Application", issued on Apr. 15, 2025, p. 1-p. 15.

*Primary Examiner* — Nitin Patel
*Assistant Examiner* — Amen W Bogale
(74) *Attorney, Agent, or Firm* — JCIPRNET

(57) ABSTRACT

Disclosed are a display device, a display driving circuit thereof, and an operating method thereof. The display device includes a power management circuit and a display driving circuit. The display driving circuit converts a power voltage provided by the power management circuit into a first boundary voltage and a second boundary voltage, and generates multiple gamma voltages based on the first boundary voltage and the second boundary voltage. When a system condition transitions from a normal state to a specified state, the first boundary voltage transitions to a specified boundary level, and the power voltage transitions to a specified power level. When the system condition returns from the specified state to the normal state, the first boundary voltage returns to a normal boundary level, and the power voltage returns to a normal power level.

30 Claims, 11 Drawing Sheets

(56) References Cited

U.S. PATENT DOCUMENTS

| | | | | |
|---|---|---|---|---|
| 2008/0018569 | A1* | 1/2008 | Sung | G09G 3/3233 345/82 |
| 2012/0044231 | A1* | 2/2012 | Park | G06F 1/263 345/211 |
| 2012/0120124 | A1* | 5/2012 | Zhang | G09G 3/3648 345/89 |
| 2013/0135272 | A1* | 5/2013 | Park | G09G 3/3233 345/211 |
| 2013/0176348 | A1* | 7/2013 | Tsai | G09G 3/3614 345/209 |
| 2015/0170609 | A1* | 6/2015 | Jung | G09G 3/20 345/212 |
| 2016/0117992 | A1* | 4/2016 | Park | G09G 3/3275 345/76 |
| 2016/0314732 | A1 | 10/2016 | Amundson et al. | |
| 2017/0061860 | A1* | 3/2017 | Park | G09G 3/3648 |
| 2020/0302861 | A1* | 9/2020 | Pyo | G09G 3/3225 |
| 2021/0280121 | A1* | 9/2021 | Nam | G09G 3/3696 |
| 2021/0327350 | A1* | 10/2021 | Nam | G09G 3/2025 |
| 2021/0375214 | A1* | 12/2021 | Kim | G09G 3/3275 |
| 2022/0051599 | A1* | 2/2022 | Kang | G09G 3/20 |
| 2022/0189430 | A1* | 6/2022 | Kim | G09G 3/3685 |
| 2022/0328015 | A1* | 10/2022 | Sun | G09G 3/3406 |
| 2023/0010212 | A1 | 1/2023 | Park et al. | |
| 2024/0194163 | A1* | 6/2024 | Kim | G09G 3/3688 |
| 2024/0305195 | A1* | 9/2024 | Seo | H02M 3/156 |

* cited by examiner

DISPLAY DEVICE AND DISPLAY DRIVING CIRCUIT AND OPERATING METHOD THEREOF

CROSS-REFERENCE TO RELATED APPLICATION

This application claims the priority benefit of U.S. provisional application Ser. No. 63/650,877, filed on May 22, 2024. The entirety of the above-mentioned patent application is hereby incorporated by reference herein and made a part of this specification.

BACKGROUND

Technical Field

The disclosure relates to an electronic device, and in particular to a display device, a display driving circuit thereof, and an operating method thereof.

Description of Related Art

In display devices (e.g., handheld mobile phones), the display driver integrated circuit (DDIC) drives the data lines (also referred to as source lines) of the organic light-emitting diode (OLED) display panel based on the control of the application processor (AP). Generally, the power voltage (AVDD) in the display device remains constant. How to reduce the power consumption of the display device has been one of the technical problems in the art.

SUMMARY

The disclosure provides a display device, a display driving circuit thereof, and an operating method thereof to reduce power consumption in response to the system condition.

In an embodiment of the disclosure, the display device includes a power management circuit and a display driving circuit. The power management circuit is used to provide a power voltage. The display driving circuit is coupled to the power management circuit to receive the power voltage. The display driving circuit converts the power voltage into a first boundary voltage and a second boundary voltage of a gamma voltage range. The display driving circuit generates multiple gamma voltages within the gamma voltage range based on the first boundary voltage and the second boundary voltage. The display driving circuit drives a display panel based on the gamma voltages. The display driving circuit controls the power management circuit to set a level of the power voltage. In response to a system condition transitioning from a normal state to a specified state, the display driving circuit adjusts the first boundary voltage, enabling the first boundary voltage to transition from a normal boundary level to a specified boundary level, and controls the power management circuit to adjust the power voltage, enabling the power voltage to transition from a normal power level to a specified power level. In response to the system condition returning from the specified state to the normal state, the display driving circuit adjusts the first boundary voltage, enabling the first boundary voltage to return from the specified boundary level to the normal boundary level, and controls the power management circuit to adjust the power voltage, enabling the power voltage to return from the specified power level to the normal power level.

In an embodiment of the disclosure, the display driving circuit includes a gamma voltage device and a controller. The gamma voltage device is used to provide multiple gamma voltages to a source driver. The gamma voltage device converts a power voltage provided by a power management circuit into a first boundary voltage and a second boundary voltage of a gamma voltage range, and the gamma voltage device generates the gamma voltages based on the first boundary voltage and the second boundary voltage. The controller is coupled to the gamma voltage device. The controller controls the gamma voltage device to set a level of the first boundary voltage and a level of the second boundary voltage. The controller controls the power management circuit through the gamma voltage device or a digital interface to set a level of the power voltage. In response to a system condition transitioning from a normal state to a specified state, the controller controls the gamma voltage device to adjust the first boundary voltage, enabling the first boundary voltage to transition from a normal boundary level to a specified boundary level, and controls the power management circuit to adjust the power voltage, enabling the power voltage to transition from a normal power level to a specified power level. In response to the system condition returning from the specified state to the normal state, the controller controls the gamma voltage device to adjust the first boundary voltage, enabling the first boundary voltage to return from the specified boundary level to the normal boundary level, and controls the power management circuit to adjust the power voltage, enabling the power voltage to return from the specified power level to the normal power level.

In an embodiment of the disclosure, the operating method includes the following steps. A gamma voltage device of the display driving circuit provides multiple gamma voltages to a source driver. The gamma voltage device converts a power voltage provided by a power management circuit into a first boundary voltage and a second boundary voltage of a gamma voltage range, and the gamma voltage device generates the gamma voltages based on the first boundary voltage and the second boundary voltage. In response to a system condition transitioning from a normal state to a specified state, the gamma voltage device is controlled to adjust the first boundary voltage, enabling the first boundary voltage to transition from a normal boundary level to a specified boundary level, and the power management circuit is controlled to adjust the power voltage, enabling the power voltage to transition from a normal power level to a specified power level. In response to the system condition returning from the specified state to the normal state, the gamma voltage device is controlled to adjust the first boundary voltage, enabling the first boundary voltage to return from the specified boundary level to the normal boundary level, and the power management circuit is controlled to adjust the power voltage, enabling the power voltage to return from the specified power level to the normal power level.

Based on the above, in the embodiments of the disclosure, the first boundary voltage and the power voltage may be dynamically adjusted in response to the system condition. For example, when an ambient brightness changes, the first boundary voltage and the power voltage may be dynamically pulled down to reduce power consumption. For another example, when an operating mode of the display device is changed, the first boundary voltage and the power voltage may also be dynamically pulled down to reduce power consumption.

To make the features and advantages of the disclosure more comprehensible, several embodiments accompanied with drawings are described in detail as follows.

DESCRIPTION OF THE EMBODIMENTS

Figure 1:
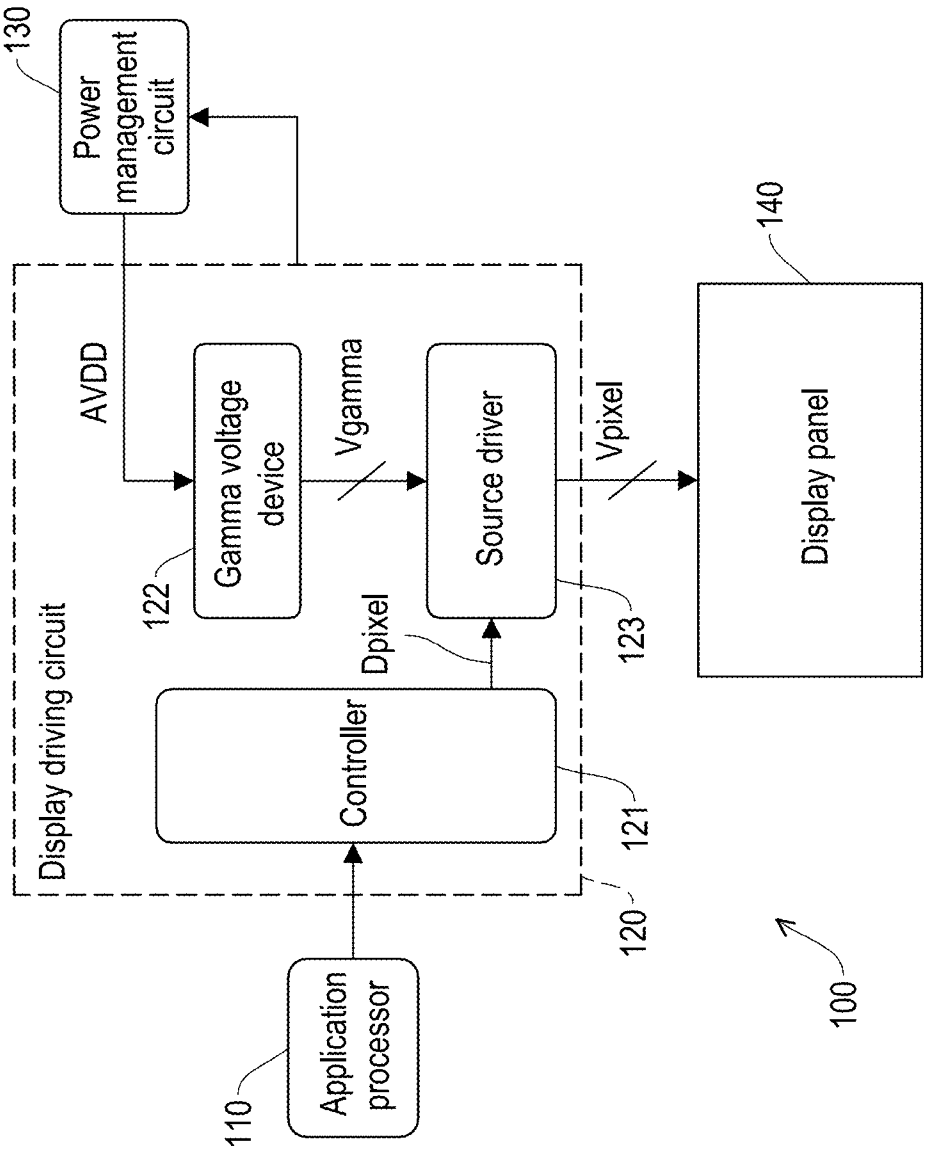
FIG. 1 is a schematic circuit block diagram of a display device according to an embodiment of the disclosure.

The term "coupling" (or "connection") used throughout this specification (including the claims) may refer to any direct or indirect means of connection. For example, if it is herein described that a first device is coupled (or connected) to a second device, it should be interpreted that the first device may be directly connected to the second device, or the first device may be indirectly connected to the second device through another device or some connection means. The terms "first", "second", and the like as mentioned throughout the present specification (including the claims) are used to name the elements or to distinguish between different embodiments or scopes, rather than setting an upper or lower limit on the number of the elements or the order of the elements. In addition, wherever possible, elements/components/steps with the same reference numerals in the drawings and embodiments represent the same or similar parts. Wherever possible, elements/components/steps with the same reference numbers are used in the drawings and the description to refer to the same or like parts. Cross-reference may be made between the elements/components/steps in different embodiments that are denoted by the same reference numerals or that have the same names.

FIG. 1 is a schematic circuit block diagram of a display device 100 according to an embodiment of the disclosure. The display device 100 shown in FIG. 1 includes an application processor (AP) 110, a display driving circuit 120, a power management circuit 130, and a display panel 140. The specific implementation method of the display panel 140 is not limited by this embodiment. For example, in some practical applications, the display panel 140 may include an organic light-emitting diode (OLED) display panel or other display panels.

In some practical applications, the display driving circuit 120 and the power management circuit 130 may be different integrated circuits (IC). For example, the display driving circuit 120 may be a display driver integrated circuit (DDIC), and the power management circuit 130 may be a power management integrated circuit (PMIC). In other practical applications, the display driving circuit 120 and the power management circuit 130 may be integrated into the same intergrated circuit. Based on the control of the application processor 110, the display driving circuit 120 drives multiple data lines (i.e., source lines; not shown in FIG. 1) of the display panel 140.

The power management circuit 130 is used to provide a power voltage AVDD to the internal components (e.g., the display driving circuit 120) of the display device 100. The display driving circuit 120 is coupled to the power management circuit 130 to receive the power voltage AVDD. The display driving circuit 120 converts the power voltage AVDD into a first boundary voltage VGMP (not shown in FIG. 1) and a second boundary voltage VGSP (not shown in FIG. 1) of a gamma voltage range. Levels of the first boundary voltage VGMP and the second boundary voltage VGSP may be determined according to the actual design and application. The display driving circuit 120 generates multiple gamma voltages Vgamma within the gamma voltage range based on the first boundary voltage VGMP and the second boundary voltage VGSP. The display driving circuit 120 drives the display panel 140 based on the gamma voltages Vgamma. Specifically, the display driving circuit 120 converts multiple pixel data Dpixel of a scan line into multiple driving voltages Vpixel based on the gamma voltages Vgamma, and then drives multiple data lines (not shown in FIG. 1) of the display panel 140 with the driving voltages Vpixel.

In the embodiment shown in FIG. 1, the display driving circuit 120 controls the power management circuit 130 to set a level of the power voltage AVDD. In some embodiments, the display driving circuit 120 may control the power management circuit 130 through a digital interface so as to adjust the level of the power voltage AVDD. Based on the actual design, the digital interface may include a single wire protocol (SWIRE) interface or other digital communication interfaces. In other embodiments, the power management circuit 130 is coupled to the display driving circuit 120 to receive the first boundary voltage VGMP (not shown in FIG. 1). The power management circuit 130 converts the first boundary voltage VGMP into the power voltage AVDD. Thus, the level of the power voltage AVDD follows a level of the first boundary voltage VGMP. In response to a system condition transitioning from a normal state to a specified state, the display driving circuit 120 adjusts the first boundary voltage VGMP (not shown in FIG. 1), enabling the first boundary voltage VGMP to transition from a normal boundary level to a specified boundary level. Moreover, the display driving circuit 120 controls the power management circuit 130 to adjust the power voltage AVDD, enabling the power voltage AVDD to transition from a normal power level to a specified power level. In response to the system condition returning from the specified state to the normal state, the display driving circuit 120 adjusts the first boundary voltage VGMP, enabling the first boundary voltage VGMP to return from the specified boundary level to the normal boundary level. Moreover, the display driving circuit 120 controls the power management circuit 130 to adjust the power voltage AVDD, enabling the power voltage AVDD to return from the specified power level to the normal power level.

Figure 2:
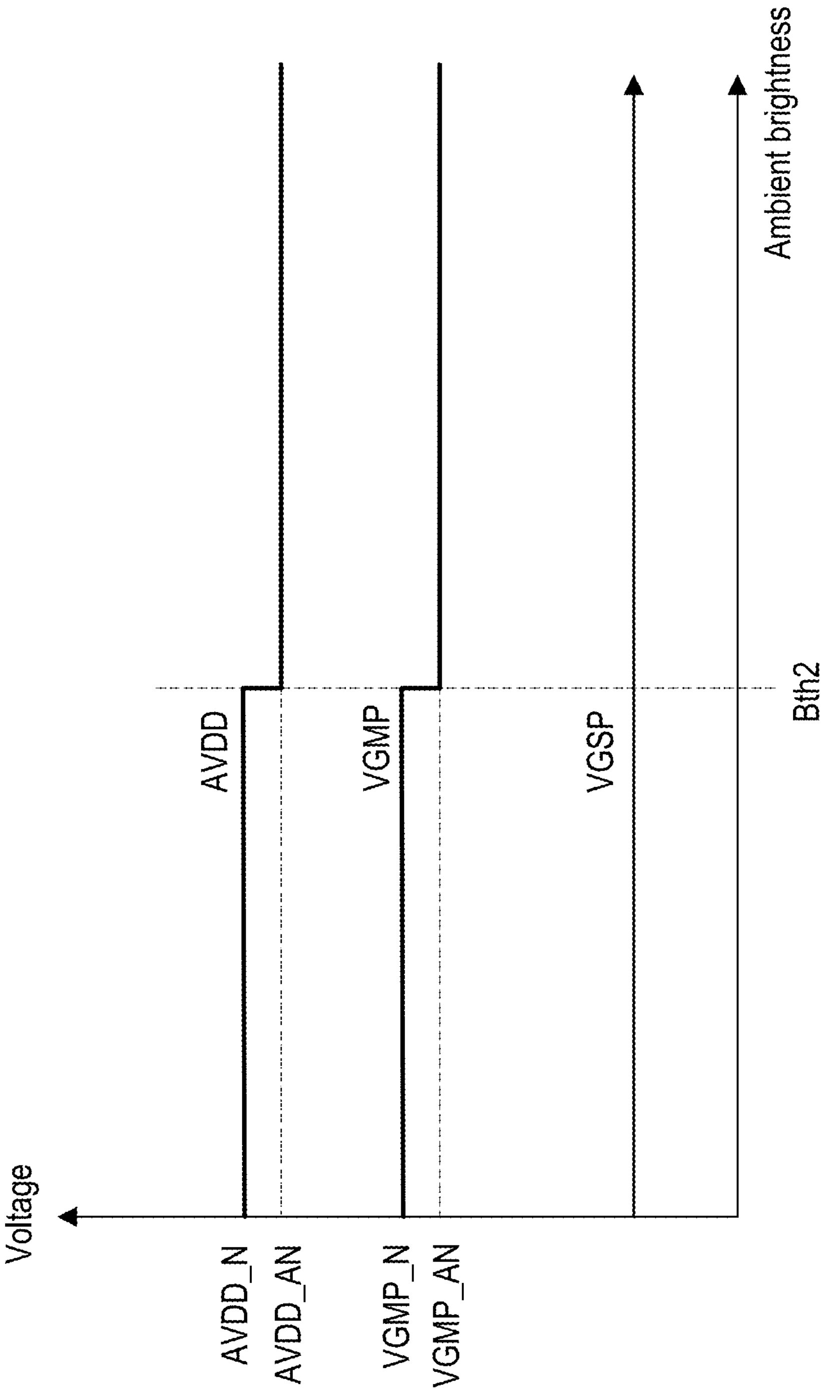
FIG. 2 is a schematic diagram showing an ambient brightness, a first boundary voltage, and a power voltage according to an embodiment of the disclosure.

For example, FIG. 2 is a schematic diagram showing an ambient brightness, the first boundary voltage VGMP, and the power voltage AVDD according to an embodiment of the disclosure. In the embodiment shown in FIG. 2, the system condition includes ambient brightness. Referring to FIGS. 1 and 2, in response to the ambient brightness being lower than a threshold brightness Bth2, the first boundary voltage VGMP is at a normal boundary level VGMP_N, and the power voltage AVDD is at a normal power level AVDD_N. In response to the ambient brightness being higher than the threshold brightness Bth2, the first boundary voltage VGMP is at a specified boundary level VGMP_AN lower than the normal boundary level VGMP_N, and the power voltage AVDD is at a specified power level AVDD_AN lower than the normal power level AVDD_N. The normal power level AVDD_N, the specified power level AVDD_AN, the normal boundary level VGMP_N, and the specified boundary level VGMP_AN may be determined according to the actual design and application. When the ambient brightness changes, the first boundary voltage VGMP and the power voltage AVDD may be dynamically pulled down to reduce power consumption. It is noted that although the embodiment shown in FIG. 2 is a single-step example (with a single specified power level AVDD_AN and a single specified boundary level VGMP_AN), the embodiment may be extended to a multi-step example by analogy according to the relevant description of FIG. 2.

Figure 3:
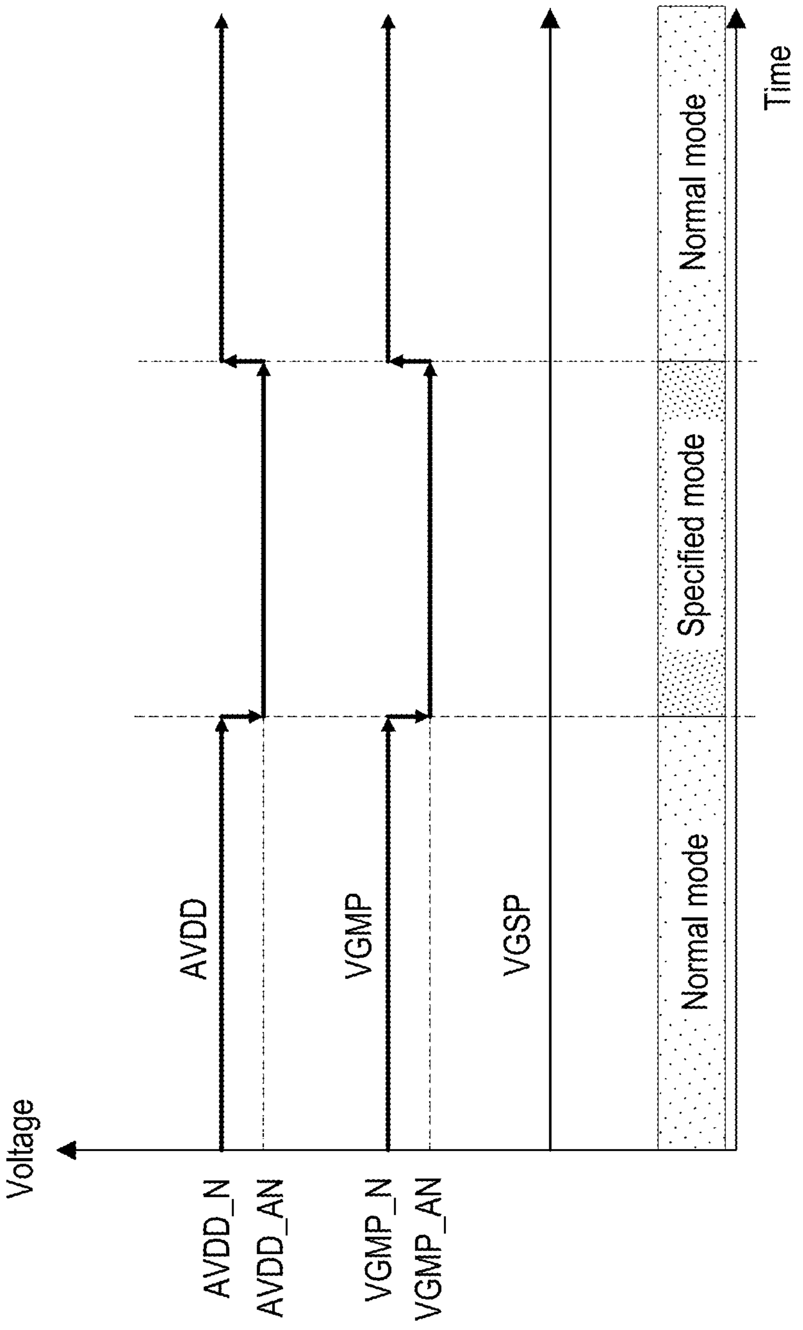
FIG. 3 is a schematic diagram showing an operating mode, a first boundary voltage, and a power voltage according to another embodiment of the disclosure.

For another example, FIG. 3 is a schematic diagram showing an operating mode, the first boundary voltage VGMP, and the power voltage AVDD according to another embodiment of the disclosure. The horizontal axis in FIG. 3 represents time. In the embodiment shown in FIG. 3, the system condition includes the operating mode. Referring to FIGS. 1 and 3, in response to the operating mode being a normal mode, the first boundary voltage VGMP is at the normal boundary level VGMP_N, and the power voltage AVDD is at the normal power level AVDD_N. In response to the operating mode being a specified mode, the first boundary voltage VGMP is at the specified boundary level VGMP_AN lower than the normal boundary level VGMP_N, and the power voltage AVDD is at the specified power level AVDD_AN lower than the normal power level AVDD_N. Based on the actual operation and design, the specified mode includes an always-on display (AOD) mode or other modes. When the operating mode of the display device is changed, the first boundary voltage VGMP and the power voltage AVDD may also be dynamically pulled down to reduce power consumption. It is noted that although the embodiment shown in FIG. 3 is a single-step example (with a single specified power level AVDD_AN and a single specified boundary level VGMP_AN), the embodiment may be extended to a multi-step example by analogy according to the relevant description of FIG. 3.

Referring to FIG. 1, the display driving circuit 120 includes a controller 121, a gamma voltage device 122, and a source driver 123. The gamma voltage device 122 is coupled to the power management circuit 130 to receive the power voltage AVDD. In some embodiments, the controller 121 may be implemented as a hardware circuit according to different designs. In other embodiments, the controller 121 may be implemented in a form of a combination of hardware, firmware, and software (i.e., programs).

In terms of the form of hardware, the controller 121 may be implemented as a logic circuit on an integrated circuit. For example, the relevant functions of the controller 121 may be implemented with one or more hardware controllers, microcontrollers, hardware processors, microprocessors, application-specific integrated circuits (ASIC), digital signal processors (DSP), field-programmable gate arrays (FPGA), central processing units (CPU), and/or any logic blocks, modules, and circuits in other processing units. The relevant functions of the controller 121 may be implemented with hardware circuits, such as any logic blocks, modules, and circuits in integrated circuits, by using hardware description languages (e.g., Verilog HDL or VHDL) or other suitable programming languages.

In terms of the form of software and/or firmware, the relevant functions of the controller 121 may be implemented as programming codes. For example, the controller 121 may be implemented using general programming languages (e.g., C, C++, or assembly languages) or other suitable programming languages. The programming codes may be recorded/stored in a "non-transitory machine-readable storage medium". In some embodiments, the non-transitory machine-readable storage medium may include, for example, semiconductor memory and/or storage devices. Electronic equipment (e.g., a CPU, hardware controller, microcontroller, hardware processor, or microprocessor) reads the programming codes from the non-transitory machine-readable storage medium and executes the programming codes so as to implement the relevant functions of the controller 121.

Figure 4:
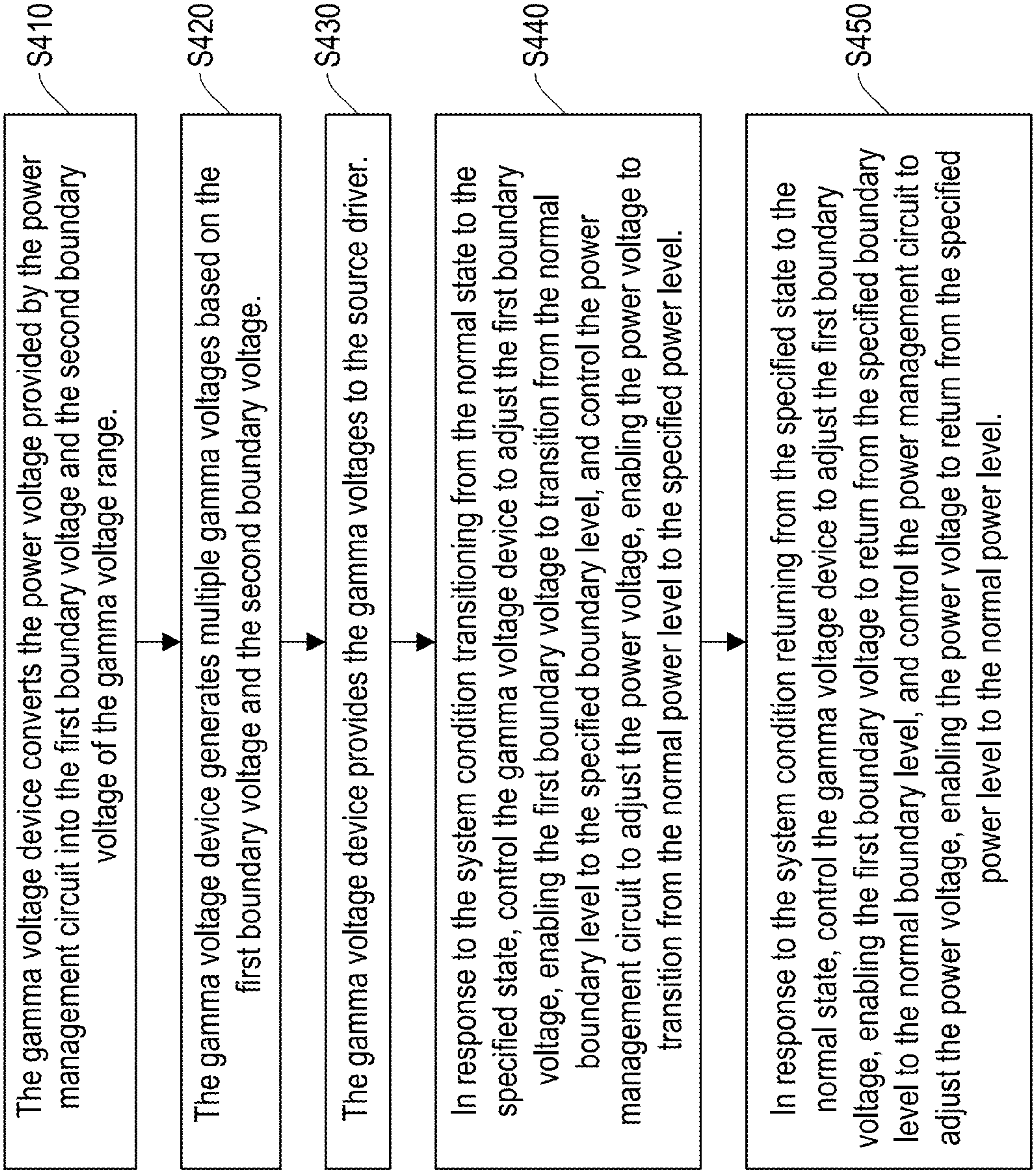
FIG. 4 is a schematic flowchart of an operating method of a display driving circuit according to an embodiment of the disclosure.

FIG. 4 is a schematic flowchart of an operating method of a display driving circuit according to an embodiment of the disclosure. Referring to FIGS. 1 and 4, in Step S410, the gamma voltage device 122 converts the power voltage AVDD provided by the power management circuit 130 into the first boundary voltage VGMP (not shown in FIG. 1) and the second boundary voltage VGSP (not shown in FIG. 1) of the gamma voltage range. In Step S420, the gamma voltage device 122 generates the gamma voltages Vgamma based on the first boundary voltage VGMP and the second boundary voltage VGSP. The gamma voltage device 122 is coupled to the source driver 123. In Step S430, the gamma voltage device 122 provides the gamma voltages Vgamma to the source driver 123. The source driver 123 drives multiple data lines (not shown in FIG. 1) of the display panel 140 based on the gamma voltage Vgamma.

The controller 121 is coupled to the gamma voltage device 122 and the source driver 123. The controller 121 controls the gamma voltage device 122 to set the level of the first boundary voltage VGMP (not shown in FIG. 1) and a level of the second boundary voltage VGSP (not shown in FIG. 1). In some embodiments, the controller 121 may control the power management circuit 130 through the digital interface (e.g., the SWIRE interface) so as to set/adjust the level of the power voltage AVDD. In other embodiments, the power management circuit 130 is coupled to the gamma voltage device 122 to receive the first boundary voltage VGMP. Thus, the controller 121 may control the power management circuit 130 through the gamma voltage device 122 to set the level of the power voltage AVDD.

In Step S440, in response to the system condition transitioning from the normal state to the specified state, the controller 121 controls the gamma voltage device 122 to adjust the first boundary voltage VGMP, enabling the first boundary voltage VGMP to transition from the normal boundary level VGMP_N to the specified boundary level VGMP_AN, and controls the power management circuit

130 to adjust the power voltage AVDD, enabling the power voltage AVDD to transition from the normal power level AVDD_N to the specified power level AVDD_AN. In Step S450, in response to the system condition returning from the specified state to the normal state, the controller 121 controls the gamma voltage device 122 to adjust the first boundary voltage VGMP, enabling the first boundary voltage VGMP to return from the specified boundary level VGMP_AN to the normal boundary level VGMP_N, and controls the power management circuit 130 to adjust the power voltage AVDD, enabling the power voltage AVDD to return from the specified power level AVDD_AN to the normal power level AVDD_N.

Figure 5:
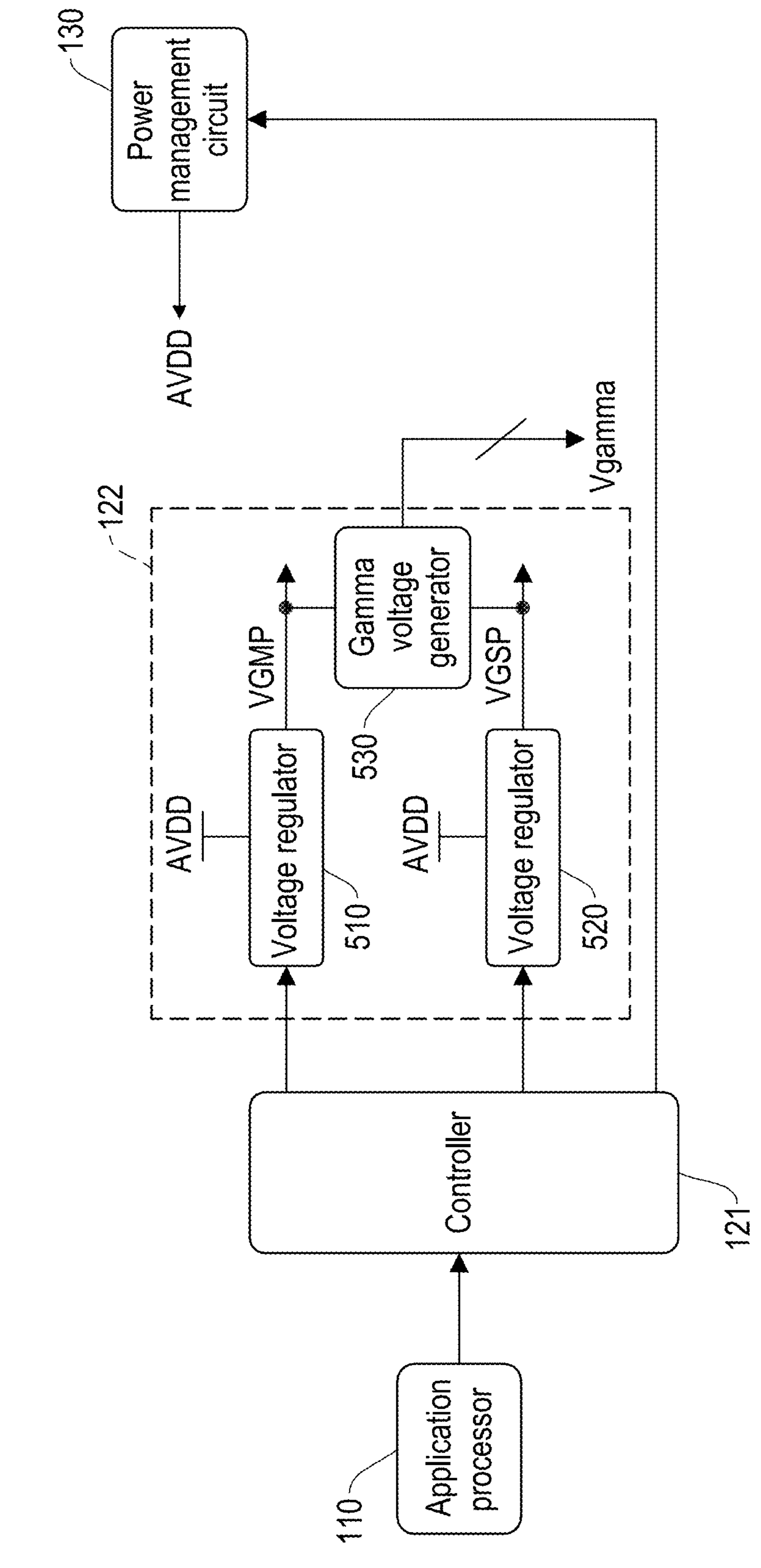
FIG. 5 is a schematic circuit block diagram of a gamma voltage device according to an embodiment of the disclosure.

FIG. 5 is a schematic circuit block diagram of a gamma voltage device 122 according to an embodiment of the disclosure. The gamma voltage device 122 shown in FIG. 5 may serve as one of many exemplary implementations of the gamma voltage device 122 shown in FIG. 1. In the embodiment shown in FIG. 5, the controller 121 may control the power management circuit 130 through the digital interface (e.g., the SWIRE interface) so as to set/adjust the level of the power voltage AVDD. The gamma voltage device 122 shown in FIG. 5 includes voltage regulators 510 and 520 as well as a gamma voltage generator 530. The voltage regulators 510 and 520 are coupled to the power management circuit 130 to receive the power voltage AVDD. Based on the control of the controller 121, the voltage regulator 510 converts the power voltage AVDD into the first boundary voltage VGMP, and the voltage regulator 520 converts the power voltage AVDD into the second boundary voltage VGSP.

The gamma voltage generator 530 is coupled to the voltage regulators 510 and 520 to receive the first boundary voltage VGMP and the second boundary voltage VGSP. The gamma voltage generator 530 generates the gamma voltage Vgamma for the source driver 123 based on the first boundary voltage VGMP and the second boundary voltage VGSP. The specific implementation method of the gamma voltage generator 530 is not limited by this disclosure. For example, in some embodiments, the gamma voltage generator 530 includes a voltage divider circuit (e.g., a resistor string) coupled to the first boundary voltage VGMP and the second boundary voltage VGSP, and the voltage divider circuit may generate multiple divided voltages (the gamma voltages Vgamma within the gamma voltage range) that fall between the first boundary voltage VGMP and the second boundary voltage VGSP.

The controller 121 controls the voltage regulators 510 and 520 to set the level of the first boundary voltage VGMP and the level of the second boundary voltage VGSP, further adjusting a level of the gamma voltages Vgamma. In addition, the controller 121 controls the power management circuit 130 through the digital interface (e.g., the SWIRE interface) so as to set the level of the power voltage AVDD. In response to the system condition transitioning from the normal state to the specified state, the controller 121 controls the voltage regulator 510 to adjust the first boundary voltage VGMP, enabling the first boundary voltage VGMP to transition from the normal boundary level VGMP_N to the specified boundary level VGMP_AN. The controller 121 also controls the power management circuit 130 to adjust the power voltage AVDD, enabling the power voltage AVDD to transition from the normal power level AVDD_N to the specified power level AVDD_AN. In response to the system condition returning from the specified state to the normal state, the controller 121 controls the voltage regulator 510 to adjust the first boundary voltage VGMP, enabling the first boundary voltage VGMP to return from the specified boundary level VGMP_AN to the normal boundary level VGMP_N. The controller 121 also controls the power management circuit 130 to adjust the power voltage AVDD, enabling the power voltage AVDD to return from the specified power level AVDD_AN to the normal power level AVDD_N.

Figure 6:
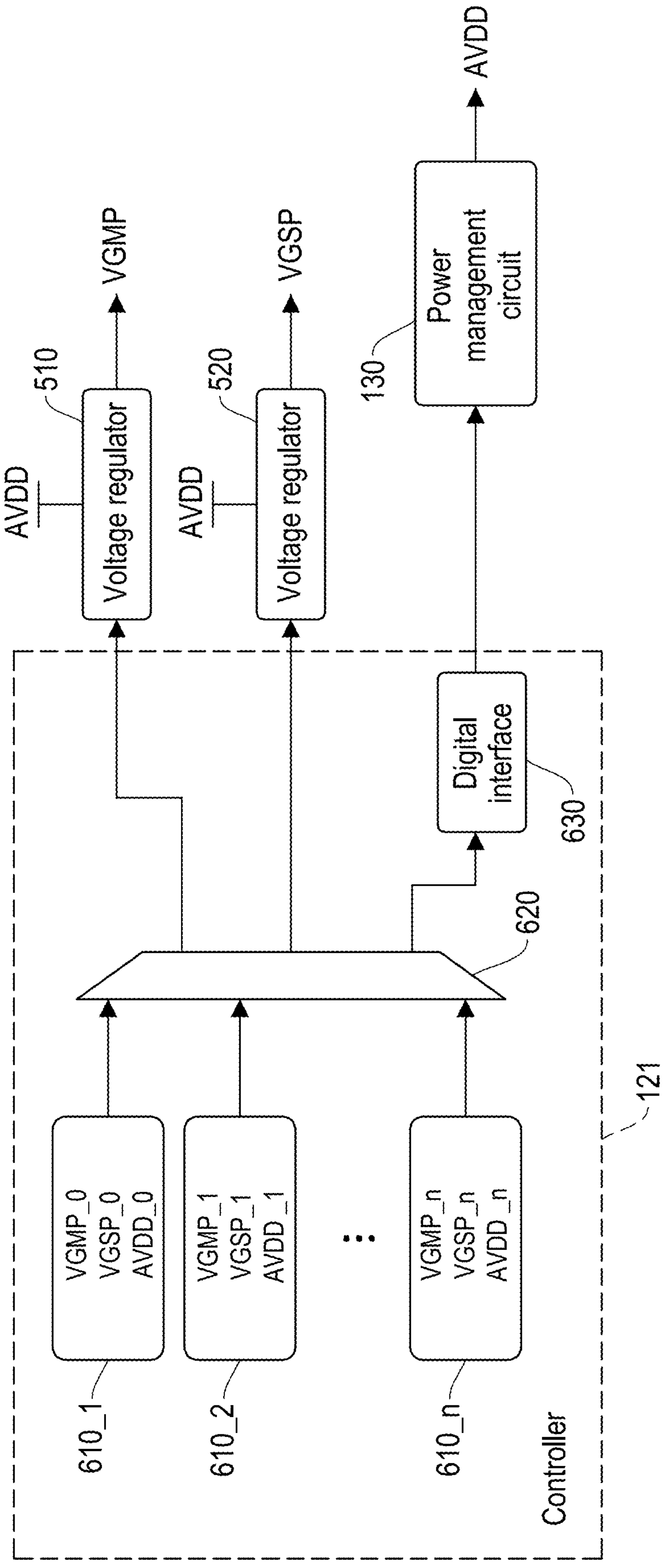
FIG. 6 is a schematic circuit block diagram of a controller according to an embodiment of the disclosure.

FIG. 6 is a schematic circuit block diagram of a controller according to an embodiment of the disclosure. The controller 121 shown in FIG. 6 may serve as one of many exemplary implementations of the controller 121 shown in FIG. 5. Reference may be made to the descriptions of the power management circuit 130, the voltage regulator 510, and the voltage regulator 520 shown in FIG. 5 for the power management circuit 130, the voltage regulator 510, and the voltage regulator 520 shown in FIG. 6. Thus, relevant descriptions will not be repeated here. In the embodiment shown in FIG. 6, the controller 121 includes multiple parameter sets 610_1 and 610_2 to **610_*n*. A number n of the parameter sets 610_1 to 610_*n* may be determined according to the actual design. The parameter set 610_1 includes a first boundary voltage parameter VGMP_1, a second boundary voltage parameter VGSP_1, and a power voltage parameter AVDD_1. In this analogy, the parameter set 610_2 includes a first boundary voltage parameter VGMP_2, a second boundary voltage parameter VGSP_2, and a power voltage parameter AVDD_2. The parameter set 610_*n* includes a first boundary voltage parameter VGMP_n, a second boundary voltage parameter VGSP_n, and a power voltage parameter AVDD_n. The specific contents of the parameter sets 610_1 to 610_*n*** may be set according to the actual operation.

A multiplexer 620 may select one of the parameter sets 610_1 to **610_*n*, and then transmit the selected parameter set to the power management circuit 130, the voltage regulator 510, and the voltage regulator 520. For example, if the multiplexer 620 selects the parameter set 610_1, the first boundary voltage parameter VGMP_1 is transmitted to the voltage regulator 510. The second boundary voltage parameter VGSP_1 is transmitted to the voltage regulator 520, and the power voltage parameter AVDD_1 is transmitted to the power management circuit 130 through a digital interface 630 (e.g., an SWIRE interface). Reference may be made to the descriptions of the parameter set 610_1 to perform the selection operations of the remaining parameter sets 610_2 to 610_*n*** by analogy. Thus, the descriptions will not be repeated here.

For example, the display panel 140 requires different gamma voltages under different ambient light. Thus, the gamma voltage range defined by the boundary voltages VGMP and VGSP is also different. As the ambient brightness changes, the application processor 110 notifies the controller 121 to switch between the different parameter sets 610_2 to **610_*n*** to simultaneously adjust the boundary voltages VGMP and VGSP and change the power voltage AVDD.

Figure 7:
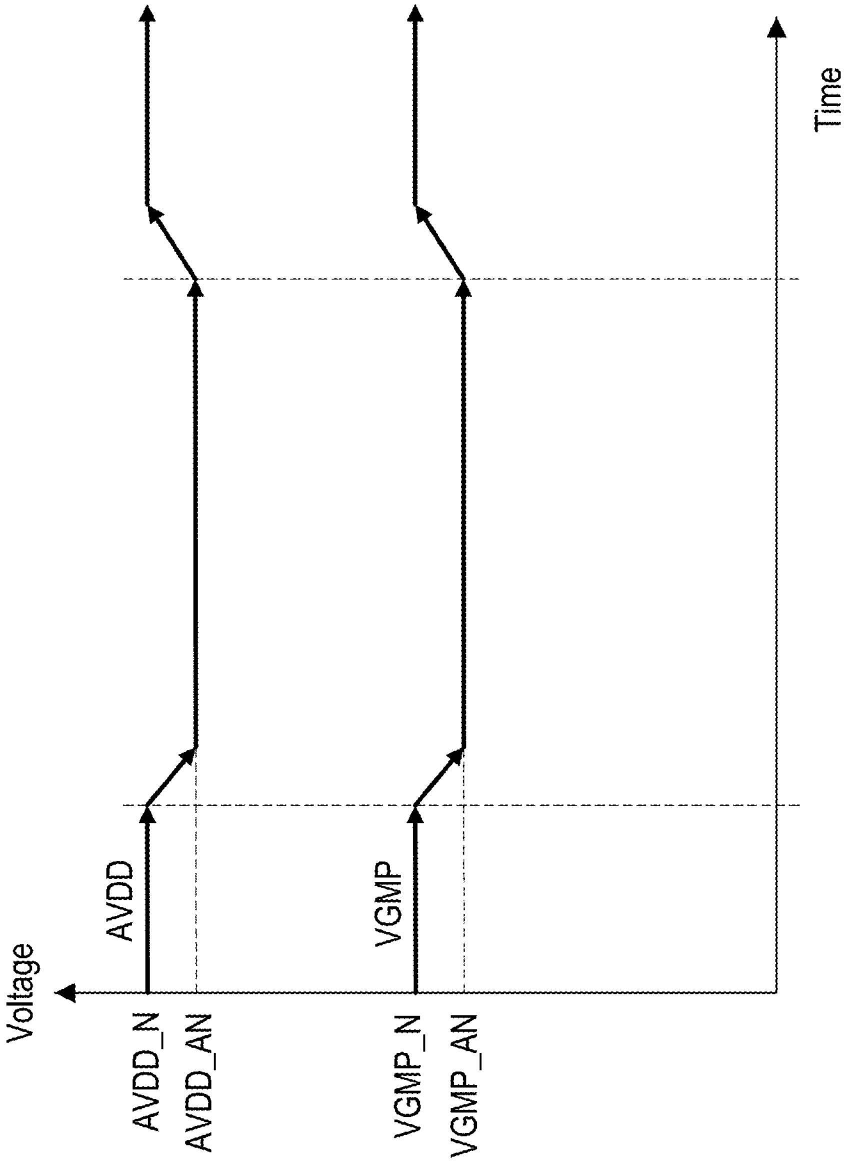
FIG. 7 is a schematic diagram showing waveforms of a first boundary voltage and a power voltage according to an embodiment of the disclosure.

FIG. 7 is a schematic diagram showing waveforms of a first boundary voltage VGMP and a power voltage AVDD according to an embodiment of the disclosure. The horizontal axis in FIG. 7 represents time. In the embodiment shown in FIG. 7, in response to the system condition transitioning from the normal state to the specified state, the first boundary voltage VGMP transitions from the normal boundary level VGMP_N to the specified boundary level VGMP_AN, and the power voltage AVDD transitions from the normal power level AVDD_N to the specified power level AVDD_AN. In response to the system condition returning from the specified state to the normal state, the first boundary voltage VGMP returns to the normal boundary level VGMP_N, and the power voltage AVDD returns to the normal power level AVDD_N. In the embodiment shown in FIG. 7, a level transition time point of the power voltage AVDD is the same as a level transition time point of the first boundary voltage VGMP.

Figure 8:
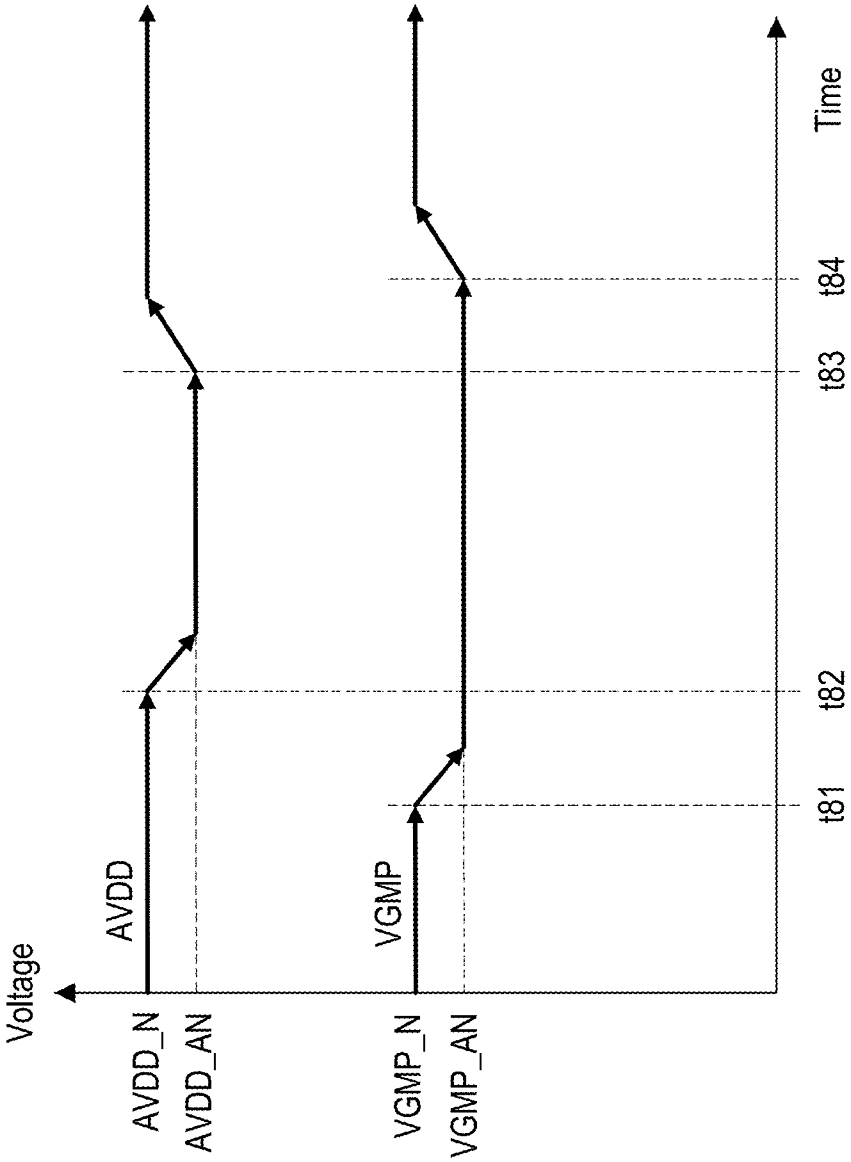
FIG. 8 is a schematic diagram showing waveforms of a first boundary voltage and a power voltage according to another embodiment of the disclosure.

FIG. 8 is a schematic diagram showing waveforms of a first boundary voltage VGMP and a power voltage AVDD according to another embodiment of the disclosure. The horizontal axis in FIG. 8 represents time. In the embodiment shown in FIG. 8, in response to the system condition transitioning from the normal state to the specified state, a level transition time point t82 of the power voltage AVDD is later than a level transition time point t81 of the first boundary voltage VGMP. In response to the system condition returning from the specified state to the normal state, a level transition time point t84 of the first boundary voltage VGMP is later than a level transition time point t83 of the power voltage AVDD.

Figure 9:
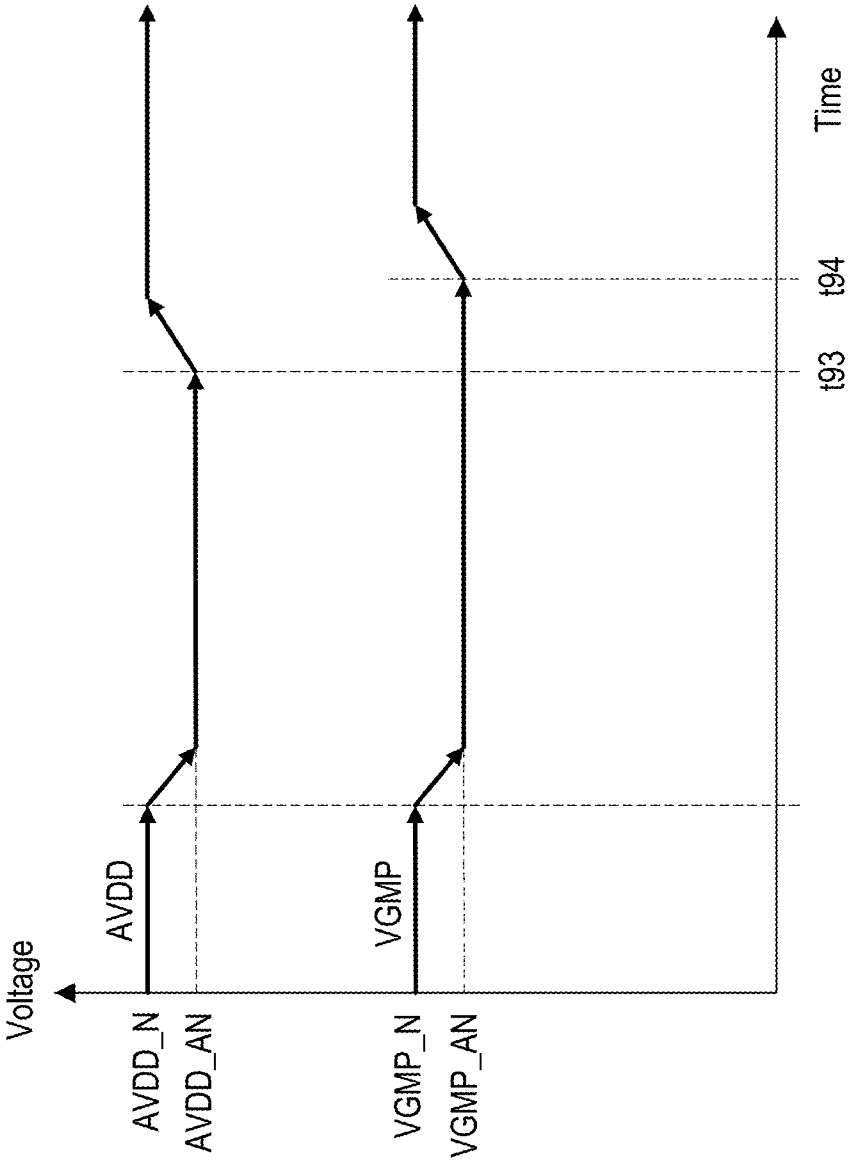
FIG. 9 is a schematic diagram showing waveforms of a first boundary voltage and a power voltage according to still another embodiment of the disclosure.

FIG. 9 is a schematic diagram showing waveforms of a first boundary voltage VGMP and a power voltage AVDD according to still another embodiment of the disclosure. The horizontal axis in FIG. 9 represents time. In the embodiment shown in FIG. 9, in response to the system condition transitioning from the normal state to the specified state, the level transition time point of the power voltage AVDD is the same as the level transition time point of the first boundary voltage VGMP. In response to the system condition returning from the specified state to the normal state, a level transition time point t94 of the first boundary voltage VGMP is later than a level transition time point t93 of the power voltage AVDD.

Figure 10:
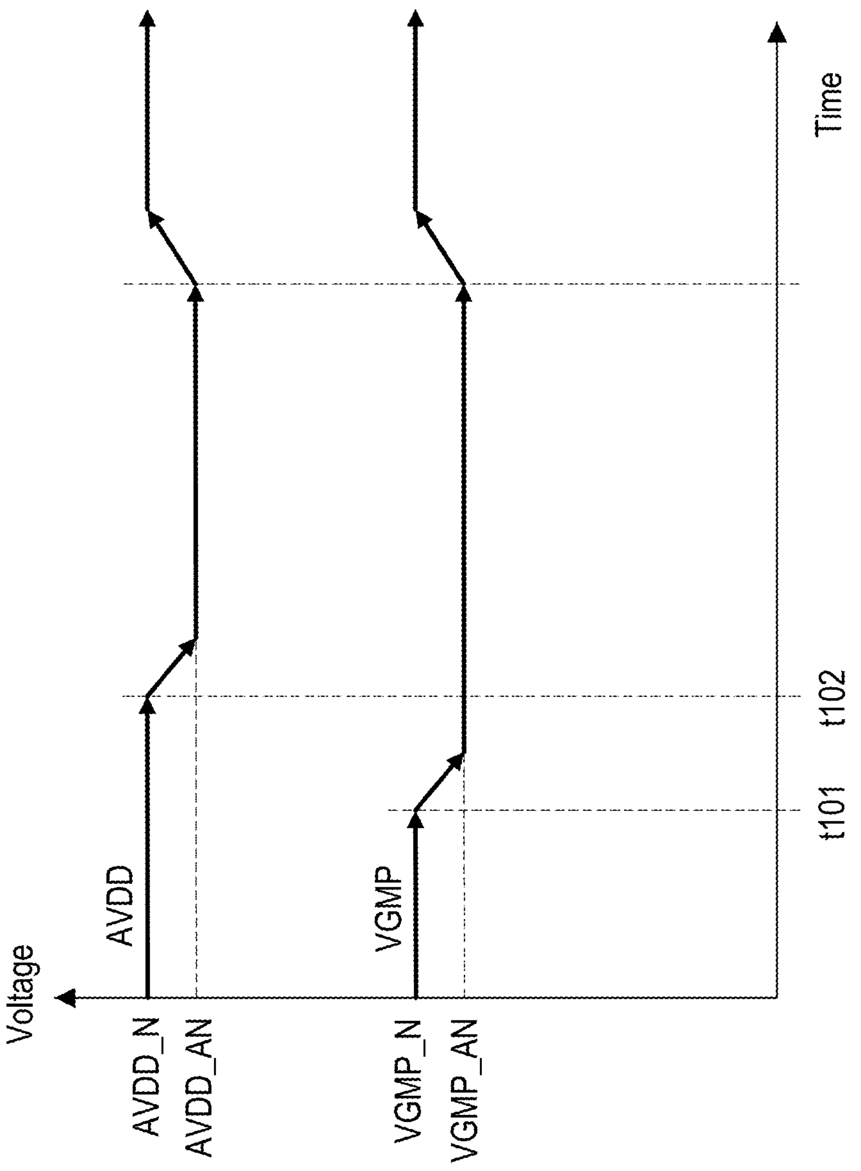
FIG. 10 is a schematic diagram showing waveforms of a first boundary voltage and a power voltage according to yet another embodiment of the disclosure.

FIG. 10 is a schematic diagram showing waveforms of a first boundary voltage VGMP and a power voltage AVDD according to yet another embodiment of the disclosure. The horizontal axis in FIG. 10 represents time. In the embodiment shown in FIG. 10, in response to the system condition transitioning from the normal state to the specified state, a level transition time point t102 of the power voltage AVDD is later than a level transition time point t101 of the first boundary voltage VGMP. In response to the system condition returning from the specified state to the normal state, the level transition time point of the first boundary voltage VGMP is the same as the level transition time point of the power voltage AVDD.

Figure 11:
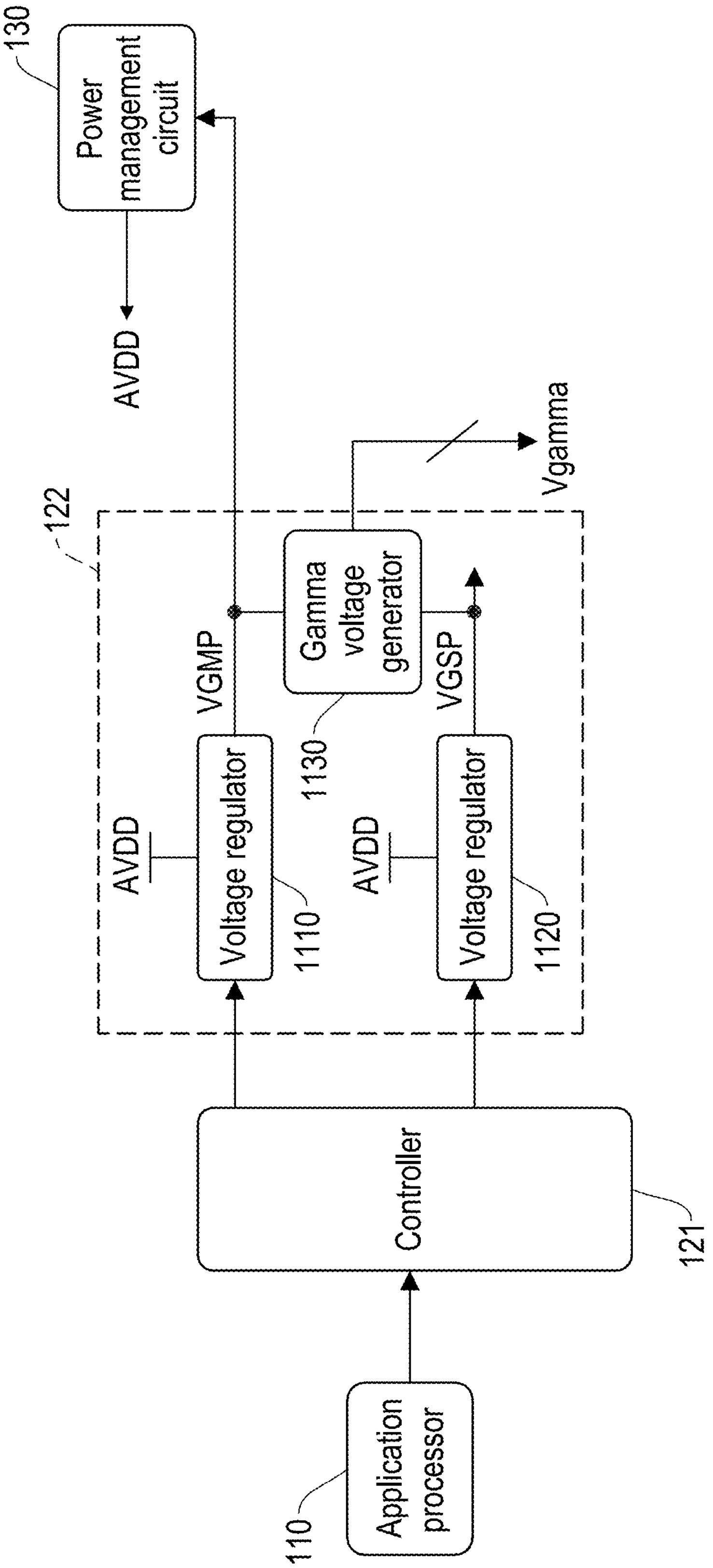
FIG. 11 is a schematic circuit block diagram of a gamma voltage device 122 according to another embodiment of the disclosure.

FIG. 11 is a schematic circuit block diagram of a gamma voltage device 122 according to another embodiment of the disclosure. The gamma voltage device 122 shown in FIG. 11 may serve as one of many exemplary implementations of the gamma voltage device 122 shown in FIG. 1. Reference may be made to the descriptions of the voltage regulator 510, the voltage regulator 520, and the gamma voltage generator 530 shown in FIG. 5 for a voltage regulator 1110, a voltage regulator 1120, and a gamma voltage generator 1130 shown in FIG. 11. Thus, relevant descriptions will not be repeated here.

In the embodiment shown in FIG. 11, the power management circuit 130 is coupled to the gamma voltage device 122 to receive the first boundary voltage VGMP. The specific implementation method of the power management circuit 130 is not limited by this embodiment. For example, the power management circuit 130 may include a charge pump, a DC-to-DC converter, or other power circuits to convert the first boundary voltage VGMP into the power voltage AVDD. Based on the actual design, the DC-to-DC converter may include a buck converter, a boost converter, a buck-boost converter, or other DC-to-DC converters. The power management circuit 130 can convert the first boundary voltage VGMP into the power voltage AVDD. Thus, the controller 121 may control the power management circuit 130 through the gamma voltage device 122 to set the level of the power voltage AVDD.

In summary, the first boundary voltage VGMP and the power voltage AVDD may be dynamically adjusted in response to the system condition. For example, when the ambient brightness changes, the first boundary voltage VGMP and the power voltage AVDD may be dynamically pulled down to reduce power consumption. For another example, when the operating mode of the display device is changed, the first boundary voltage VGMP and the power voltage AVDD may also be dynamically pulled down to reduce power consumption.

Although the disclosure has been described with reference to the above embodiments, they are not intended to limit the disclosure. It will be apparent to one of ordinary skill in the art that modifications to the described embodiments may be made without departing from the spirit and the scope of the disclosure. Accordingly, the scope of the disclosure will be defined by the attached claims and their equivalents and not by the above detailed descriptions.

What is claimed is:

1. A display device comprising:

a power management circuit used to provide a power voltage; and a display driving circuit coupled to the power management circuit to receive the power voltage, wherein the display driving circuit converts the power voltage into a first boundary voltage and a second boundary voltage of a gamma voltage range, the display driving circuit generates a plurality of gamma voltages within the gamma voltage range based on the first boundary voltage and the second boundary voltage, the display driving circuit drives a display panel based on the plurality of gamma voltages, the display driving circuit controls the power management circuit to set a level of the power voltage according to the first boundary voltage;

in response to a system condition transitioning from a normal state to a specified state, the display driving circuit adjusts the first boundary voltage, enabling the first boundary voltage to transition from a normal boundary level to a specified boundary level, and controls the power management circuit to adjust the power voltage, enabling the power voltage to transition from a normal power level to a specified power level; and in response to the system condition returning from the specified state to the normal state, the display driving circuit adjusts the first boundary voltage, enabling the first boundary voltage to return from the specified boundary level to the normal boundary level, and controls the power management circuit to adjust the power voltage, enabling the power voltage to return from the specified power level to the normal power level.

2. The display device according to claim 1, wherein the display driving circuit controls the power management circuit through a digital interface so as to adjust the level of the power voltage.

3. The display device according to claim 2, wherein the digital interface comprises a single wire protocol interface.

4. The display device according to claim 1, wherein the power management circuit is coupled to the display driving circuit to receive the first boundary voltage, the power management circuit converts the first boundary voltage into the power voltage, and the level of the power voltage follows a level of the first boundary voltage.

5. The display device according to claim 1, wherein the specified boundary level is lower than the normal boundary level, and the specified power level is lower than the normal power level.

6. The display device according to claim 1, wherein in response to the system condition transitioning from the normal state to the specified state, a level transition time point of the power voltage is the same as or later than a level transition time point of the first boundary voltage.

7. The display device according to claim 1, wherein in response to the system condition returning from the specified state to the normal state, a level transition time point of the first boundary voltage is the same as or later than a level transition time point of the power voltage.

8. The display device according to claim 1, wherein the system condition comprises an ambient brightness, in response to the ambient brightness being lower than a threshold brightness, the first boundary voltage is at the normal boundary level, and the power voltage is at the normal power level; and in response to the ambient brightness being higher than the threshold brightness, the first boundary voltage is at the specified boundary level lower than the normal boundary level, and the power voltage is at the specified power level lower than the normal power level.

9. The display device according to claim 1, wherein the system condition comprises an operating mode, in response to the operating mode being a normal mode, the first boundary voltage is at the normal boundary level, and the power voltage is at the normal power level; and in response to the operating mode being a specified mode, the first boundary voltage is at the specified boundary level lower than the normal boundary level, and the power voltage is at the specified power level lower than the normal power level.

10. The display device according to claim 9, wherein the specified mode comprises an always-on display mode.

11. The display device according to claim 1, wherein the display driving circuit comprises:

a source driver used to drive a plurality of data lines of the display panel based on the plurality of gamma voltages;

a gamma voltage device coupled to the source driver so as to provide the plurality of gamma voltages, and coupled to the power management circuit so as to receive the power voltage, wherein the gamma voltage device converts the power voltage into the first boundary voltage and the second boundary voltage, and the gamma voltage device generates the plurality of gamma voltages based on the first boundary voltage and the second boundary voltage; and a controller coupled to the gamma voltage device and the source driver, wherein the controller controls the gamma voltage device to set a level of the first boundary voltage and a level of the second boundary voltage, the controller controls the power management circuit through the gamma voltage device or a digital interface to set the level of the power voltage;

in response to the system condition transitioning from the normal state to the specified state, the controller controls the gamma voltage device to adjust the first boundary voltage, enabling the first boundary voltage to transition from the normal boundary level to the specified boundary level, and controls the power management circuit to adjust the power voltage, enabling the power voltage to transition from the normal power level to the specified power level; and in response to the system condition returning from the specified state to the normal state, the controller controls the gamma voltage device to adjust the first boundary voltage, enabling the first boundary voltage to return from the specified boundary level to the normal boundary level, and controls the power management circuit to adjust the power voltage, enabling the power voltage to return from the specified power level to the normal power level.

12. The display device according to claim 11, wherein the gamma voltage device comprises:

a first voltage regulator coupled to the power management circuit to receive the power voltage, wherein the first voltage regulator converts the power voltage into the first boundary voltage;

a second voltage regulator coupled to the power management circuit to receive the power voltage, wherein the second voltage regulator converts the power voltage into the second boundary voltage; and a gamma voltage generator coupled to the first voltage regulator and the second voltage regulator so as to receive the first boundary voltage and the second boundary voltage, wherein the gamma voltage generator generates the plurality of gamma voltages for the source driver based on the first boundary voltage and the second boundary voltage, the controller controls the first voltage regulator and the second voltage regulator to set the level of the first boundary voltage and the level of the second boundary voltage, the controller controls the power management circuit through the first voltage regulator or the digital interface to set the level of the power voltage;

in response to the system condition transitioning from the normal state to the specified state, the controller controls the first voltage regulator to adjust the first boundary voltage, enabling the first boundary voltage to transition from the normal boundary level to the specified boundary level, and the controller controls the power management circuit to adjust the power voltage, enabling the power voltage to transition from the normal power level to the specified power level; and in response to the system condition returning from the specified state to the normal state, the controller controls the first voltage regulator to adjust the first boundary voltage, enabling the first boundary voltage to return from the specified boundary level to the normal boundary level, and the controller controls the power management circuit to adjust the power voltage, enabling the power voltage to return from the specified power level to the normal power level.

13. A display driving circuit comprising:

a gamma voltage device used to provide a plurality of gamma voltages to a source driver, wherein the gamma voltage device converts a power voltage provided by a power management circuit into a first boundary voltage and a second boundary voltage of a gamma voltage range, and the gamma voltage device generates the plurality of gamma voltages based on the first boundary voltage and the second boundary voltage; and a controller coupled to the gamma voltage device, wherein the controller controls the gamma voltage device to set a level of the first boundary voltage and a level of the second boundary voltage, the controller controls the power management circuit through the gamma voltage device or a digital interface to set a level of the power voltage according to the first boundary voltage;

in response to a system condition transitioning from a normal state to a specified state, the controller controls the gamma voltage device to adjust the first boundary voltage, enabling the first boundary voltage to transition from a normal boundary level to a specified boundary level, and controls the power management circuit to adjust the power voltage, enabling the power voltage to transition from a normal power level to a specified power level; and in response to the system condition returning from the specified state to the normal state, the controller controls the gamma voltage device to adjust the first boundary voltage, enabling the first boundary voltage to return from the specified boundary level to the normal boundary level, and controls the power management circuit to adjust the power voltage, enabling the power voltage to return from the specified power level to the normal power level.

14. The display driving circuit according to claim 13, wherein the gamma voltage device comprises:

a first voltage regulator coupled to the power management circuit to receive the power voltage, wherein the first voltage regulator converts the power voltage into the first boundary voltage;

a second voltage regulator coupled to the power management circuit to receive the power voltage, wherein the second voltage regulator converts the power voltage into the second boundary voltage; and a gamma voltage generator coupled to the first voltage regulator and the second voltage regulator so as to receive the first boundary voltage and the second boundary voltage, wherein the gamma voltage generator generates the plurality of gamma voltages for the source driver based on the first boundary voltage and the second boundary voltage, the controller controls the first voltage regulator and the second voltage regulator to set the level of the first boundary voltage and the level of the second boundary voltage, the controller controls the power management circuit through the first voltage regulator or the digital interface to set the level of the power voltage;

in response to the system condition transitioning from the normal state to the specified state, the controller controls the first voltage regulator to adjust the first boundary voltage, enabling the first boundary voltage to transition from the normal boundary level to the specified boundary level, and controls the power management circuit to adjust the power voltage, enabling the power voltage to transition from the normal power level to the specified power level; and in response to the system condition returning from the specified state to the normal state, the controller controls the first voltage regulator to adjust the first boundary voltage, enabling the first boundary voltage to return from the specified boundary level to the normal boundary level, and controls the power management circuit to adjust the power voltage, enabling the power voltage to return from the specified power level to the normal power level.

15. The display driving circuit according to claim 13, wherein the controller controls the power management circuit through the digital interface to adjust the level of the power voltage, and the digital interface comprises a single wire protocol interface.

16. The display driving circuit according to claim 13, wherein the power management circuit is coupled to the gamma voltage device to receive the first boundary voltage, the power management circuit converts the first boundary voltage into the power voltage, and the level of the power voltage follows the level of the first boundary voltage.

17. The display driving circuit according to claim 13, wherein the specified boundary level is lower than the normal boundary level, and the specified power level is lower than the normal power level.

18. The display driving circuit according to claim 13, wherein in response to the system condition transitioning from the normal state to the specified state, a level transition time point of the power voltage is the same as or later than a level transition time point of the first boundary voltage.

19. The display driving circuit according to claim 13, wherein in response to the system condition returning from the specified state to the normal state, a level transition time point of the first boundary voltage is the same as or later than a level transition time point of the power voltage.

20. The display driving circuit according to claim 13, wherein the system condition comprises an ambient brightness, in response to the ambient brightness being lower than a threshold brightness, the first boundary voltage is at the normal boundary level, and the power voltage is at the normal power level; and in response to the ambient brightness being higher than the threshold brightness, the first boundary voltage is at the specified boundary level lower than the normal boundary level, and the power voltage is at the specified power level lower than the normal power level.

21. The display driving circuit according to claim 13, wherein the system condition comprises an operating mode, in response to the operating mode being a normal mode, the first boundary voltage is at the normal boundary level, and the power voltage is at the normal power level; and in response to the operating mode being a specified mode, the first boundary voltage is at the specified boundary level lower than the normal boundary level, and the power voltage is at the specified power level lower than the normal power level.

22. The display driving circuit according to claim 21, wherein the specified mode comprises an always-on display mode.

23. An operating method of a display driving circuit, comprising:

providing, by a gamma voltage device of the display driving circuit, a plurality of gamma voltages to a source driver, wherein the gamma voltage device converts a power voltage provided by a power management circuit into a first boundary voltage and a second boundary voltage of a gamma voltage range, and the gamma voltage device generates the plurality of gamma voltages based on the first boundary voltage and the second boundary voltage;

controlling, by a controller of the display driving circuit, the gamma voltage device to set a level of the first boundary voltage and a level of the second boundary voltage;

controlling, by the controller, the power management circuit through the gamma voltage device or a digital interface to set a level of the power voltage according to the first boundary voltage;

in response to a system condition transitioning from a normal state to a specified state, controlling the gamma voltage device to adjust the first boundary voltage, such that the first boundary voltage transitions from a normal boundary level to a specified boundary level, and controlling the power management circuit to adjust the power voltage, such that the power voltage transitions from a normal power level to a specified power level; and in response to the system condition returning from the specified state to the normal state, controlling the gamma voltage device to adjust the first boundary voltage, such that the first boundary voltage returns from the specified boundary level to the normal boundary level, and controlling the power management circuit to adjust the power voltage, such that the power voltage returns from the specified power level to the normal power level.

24. The operating method according to claim 23, wherein the power management circuit is coupled to the gamma voltage device to receive the first boundary voltage, the power management circuit converts the first boundary voltage into the power voltage, and a level of the power voltage follows a level of the first boundary voltage.

25. The operating method according to claim 23, wherein the specified boundary level is lower than the normal boundary level, and the specified power level is lower than the normal power level.

26. The operating method according to claim 23, wherein in response to the system condition transitioning from the normal state to the specified state, a level transition time point of the power voltage is the same as or later than a level transition time point of the first boundary voltage.

27. The operating method according to claim 23, wherein in response to the system condition returning from the specified state to the normal state, a level transition time point of the first boundary voltage is the same as or later than a level transition time point of the power voltage.

28. The operating method according to claim 23, wherein the system condition comprises an ambient brightness, in response to the ambient brightness being lower than a threshold brightness, the first boundary voltage is at the normal boundary level, and the power voltage is at the normal power level; and in response to the ambient brightness being higher than the threshold brightness, the first boundary voltage is at the specified boundary level lower than the normal boundary level, and the power voltage is at the specified power level lower than the normal power level.

29. The operating method according to claim 23, wherein the system condition comprises an operating mode, in response to the operating mode being a normal mode, the first boundary voltage is at the normal boundary level, and the power voltage is at the normal power level; and in response to the operating mode being a specified mode, the first boundary voltage is at the specified boundary level lower than the normal boundary level, and the power voltage is at the specified power level lower than the normal power level.

30. The operating method according to claim 29, wherein the specified mode comprises an always-on display mode.

* * * * *